(12) United States Patent
d'Anjou et al.

(10) Patent No.: US 6,445,714 B1
(45) Date of Patent: Sep. 3, 2002

(54) CODE GENERATOR FOR MULTIPLE CORRELATORS

(75) Inventors: Martin L. d'Anjou, Gatineau; Anatoli V. Kotov, Ottawa, both of (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/215,463

(22) Filed: Dec. 17, 1998

Related U.S. Application Data (63) Continuation-in-part of application No. 09/136,861, filed on Aug. 19, 1998.

(51) Int. Cl.[7] .............................................. H04B 7/216
(52) U.S. Cl. ........................ 370/441; 370/479; 375/141; 375/146
(58) Field of Search ................................ 370/203, 208, 370/320, 335, 441, 342, 449, 479; 375/130, 136, 137, 140–142, 147, 149–150

(56) References Cited

U.S. PATENT DOCUMENTS 5,982,763 A * 11/1999 Sato
6,069,915 A * 5/2000 Hulbert
6,256,338 B1 * 7/2001 Jalloul et al.
6,307,840 B1 * 10/2001 Wheatley, III et al.
6,333,934 B1 * 12/2001 Miura

* cited by examiner

Primary Examiner—William Luther (57) ABSTRACT

A code generation apparatus that is connected to a plurality of correlation devices connected in parallel includes an initial long code (LC) state mask, initial state registers, a state buffer, local Pseudo Noise (PN) code generators, and I and Q shift registers. The initial LC state mask inputs the mask for an LC linear feedback shift register (LFSR) that is within the local PN code generators. The initial state registers input the initial contents of in-phase and quadrature LFSRs that are also within the code generators, along with the initial contents of the LC LFSR. The local PN code generators then generate ILC and QLC sequences that are input to the I and Q shift registers respectively. The shift registers, by shifting the ILC and QLC sequences, output a plurality of shifted ILC and QLC sequences to the correlation devices. The length of the ILC and QLC sequences are greater than the number of registers within the shift registers and so, in order to compare all possible shifts in the sequences, multiple passes are required. To accomplish this, the state buffer saves the contents of the LFSRs at specific times to ensure that the next pass can begin where the last left off.

33 Claims, 7 Drawing Sheets

CODE GENERATOR FOR MULTIPLE CORRELATORS

This application is a Continuation-in-Part of copending application Ser. No. 09/136861 entitled "Searcher Architecture for CDMA Systems", filed on Aug. 19, 1998 by Kotov and assigned to the assignee of the present application.

FIELD OF THE INVENTION

This invention relates to code generators, particularly but not exclusively to code generators for use within a Code Division Multiple Access (CDMA) communication system.

BACKGROUND OF THE INVENTION

CDMA systems are well known. See, generally, CDMA Cellular Mobile Communications and Network Security, Dr. Man Young Rhee, Prentice Hall 1998, ISBN 0-13-598418-1, and standard TIA/EIA/IS-95, hereinafter "IS-95".

Figure 1:
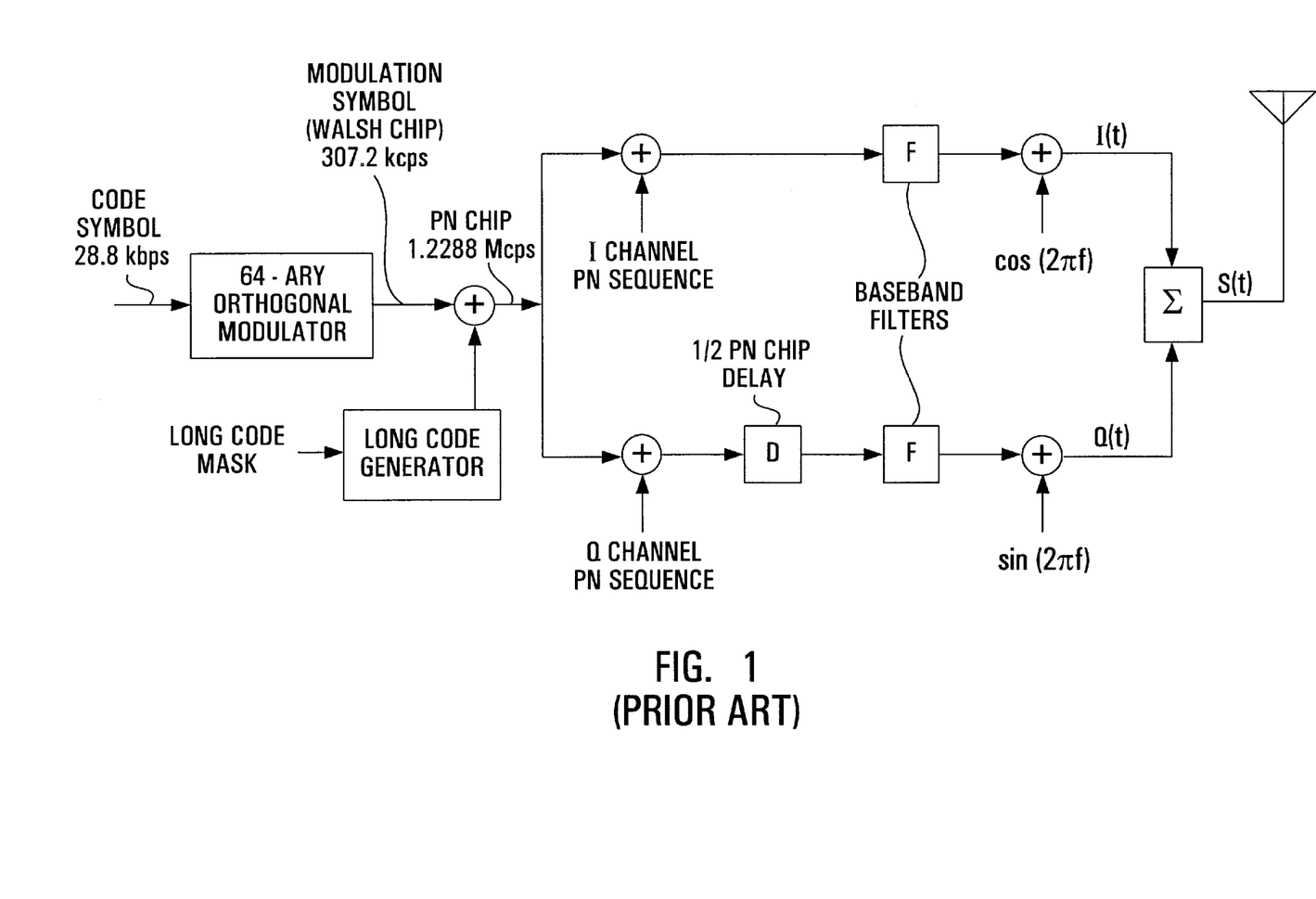
FIG. 1 is a prior art block diagram illustrating functions performed in a CDMA transmitter.

In CDMA systems, information bits transmitted from a mobile station to a base station may undergo convolutional encoding, symbol repetition, and block interleaving, the result of which is a bit stream comprising what are known as code symbols. As shown in FIG. 1, the code symbols are subsequently modulated into "Walsh chips" and "spread" into Pseudo-Noise (PN) chips by sequential bits of what is known in the CDMA art as the "long code" (LC). The PN chips are then Offset Quadrature Phase-Shift Keying (OQPSK) modulated into two channels, known as the I channel and the Q channel, the latter being delayed by one-half a PN chip duration. Spreading to the two channels is accomplished by adding the PN chip stream in modulo-2 arithmetic to sequential bits of two different pseudo-noise binary sequences known as $PN_I$ and $PN_Q$ respectively. The PN chips are then converted from baseband to a radio transmission frequency for "air link" (radio transmission) to the base station.

When the base station demodulates the signal, it converts back to baseband and undoes the aforementioned OQPSK modulation, long-code spreading, and Walsh modulation. To this end, counterparts of the mobile station's Walsh functions, long code generator, $PN_I$ generator, and $PN_Q$ generator can exist in the base station in order to produce "local replicas" of the codes used to spread and modulate the transmitted data. However, at the inception of transmission from the mobile station, the base station's generators are generally not synchronized with the received signal because of, among other things, delays occurring in transmission. Also, the mobile station may introduce delay for purposes of collision avoidance. It is thus necessary for the base station to determine the amount of transmission delay in order to effect synchronization. This is done by an apparatus generally known as a "searcher". It can generally be assumed that the delay will be no greater than a particular amount, known as the "uncertainty region".

Conventional searchers generally operate on a trial and error basis, trying, with use of correlator circuits, varying amounts of delay against the incoming received signal until meaningful results are obtained.

A "one-branch" search scheme attempts correlation against live, incoming inputs using only one correlator. Such a scheme is quite slow and cannot meet strict requirements for CDMA systems (as set forth in the IS-95 standard, for example).

A "multi-branch" scheme using live input data (essentially, a plurality of one-branch searchers, each trying a different amount of delay) are commensurately faster than one-branch schemes, but in many cases still fall short of meeting strict standards, such as those for CDMA systems.

A "total parallel" search strategy optimizes searching according to the maximum-likelihood criterion. Such schemes are much faster than "one-branch" schemes and meet the strict requirements for CDMA systems. However, this is obtained at the expense of much greater complexity and expense.

A system of parallel correlators can also be implemented on a limited basis with the complete coverage of the required search region being accomplished with use of multiple passes of multiple correlators.

One key problem with any parallel correlation strategy, whether total or limited, though is the number of code generators required. In normal correlation schemes, there is a single code generator for every correlator. In parallel correlation setups, this adds a considerable amount of complexity to an already complex implementation. As well, this requires considerable amounts of additional gates, signalling, and access ports within the overall circuit. Hence, a single enhanced code generator is required to be implemented with parallel correlators that will allow more efficient use of available resources.

SUMMARY OF THE INVENTION

It is an object of the present invention to overcome the disadvantages of the prior art and, in particular, to provide a system and method by which parallel correlators can be implemented more efficiently.

According to a first aspect, the present invention provides a code generation apparatus arranged to be coupled to a plurality of correlation devices that are each input with a first sequence of data bits, the code generation apparatus comprising a code generator, a first shift register that comprises at least one individual register, and a state buffer; wherein the code generator generates a second sequence of data bits that is output to the first shift register and the first shift register generates at least one shifted second sequence of data bits; wherein the code generation apparatus is arranged such that each of the correlation devices is input with at least one of the second sequence of data bits and the shifted second sequence of data bits; and wherein the state buffer stores, after a predetermined number of shifts in the first shift register, storage information from at least the code generator; and outputs the storage information to at least the code generator at a predetermined restore time.

According to a second aspect, the present invention provides a correlation apparatus incorporating the code generation apparatus according to the first aspect, and further comprising a plurality of correlation devices, the correlation apparatus being input with a first sequence of data bits; wherein the correlation devices are each input with the first sequence of data bits and at least one of the second sequence of data bits and the shifted second sequence of data bits.

According to a third aspect, the present invention provides in a code generation apparatus arranged to be coupled to a plurality of correlation devices that are each input with a first sequence of data bits, a method of generating a second sequence of data bits for inputting to each of the correlation devices, the method comprising the steps of: initializing a code generator; generating a second sequence of data bits with use of the code generator; shifting the second sequence of data bits in order to generate at least one shifted second sequence of data bits with use of a first shift register;

outputting at least one of the second sequence of data bits and the shifted second sequence of data bits to each of the correlation devices; after shifting the second sequence of data bits a predetermined number of shifts, saving storage information from at least the code generator; and outputting the storage information to at least the code generator at a predetermined restore time.

BRIEF DESCRIPTION OF THE DRAWINGS

The present invention is described with reference to the following figures, in which.

DETAILED DESCRIPTION OF THE PREFERRED EMBODIMENTS

Both the first and second preferred embodiments of the present invention are implemented within a form of "searcher" which determines a delay imparted to received signals by oversampling the signals, summing at least some of the samples of these signals, storing the sums in a buffer, and correlating the stored sums at an accelerated clock rate against local replicas generated with incrementing amounts of delay to determine a correlation identifying the amount of delay.

Figure 2:
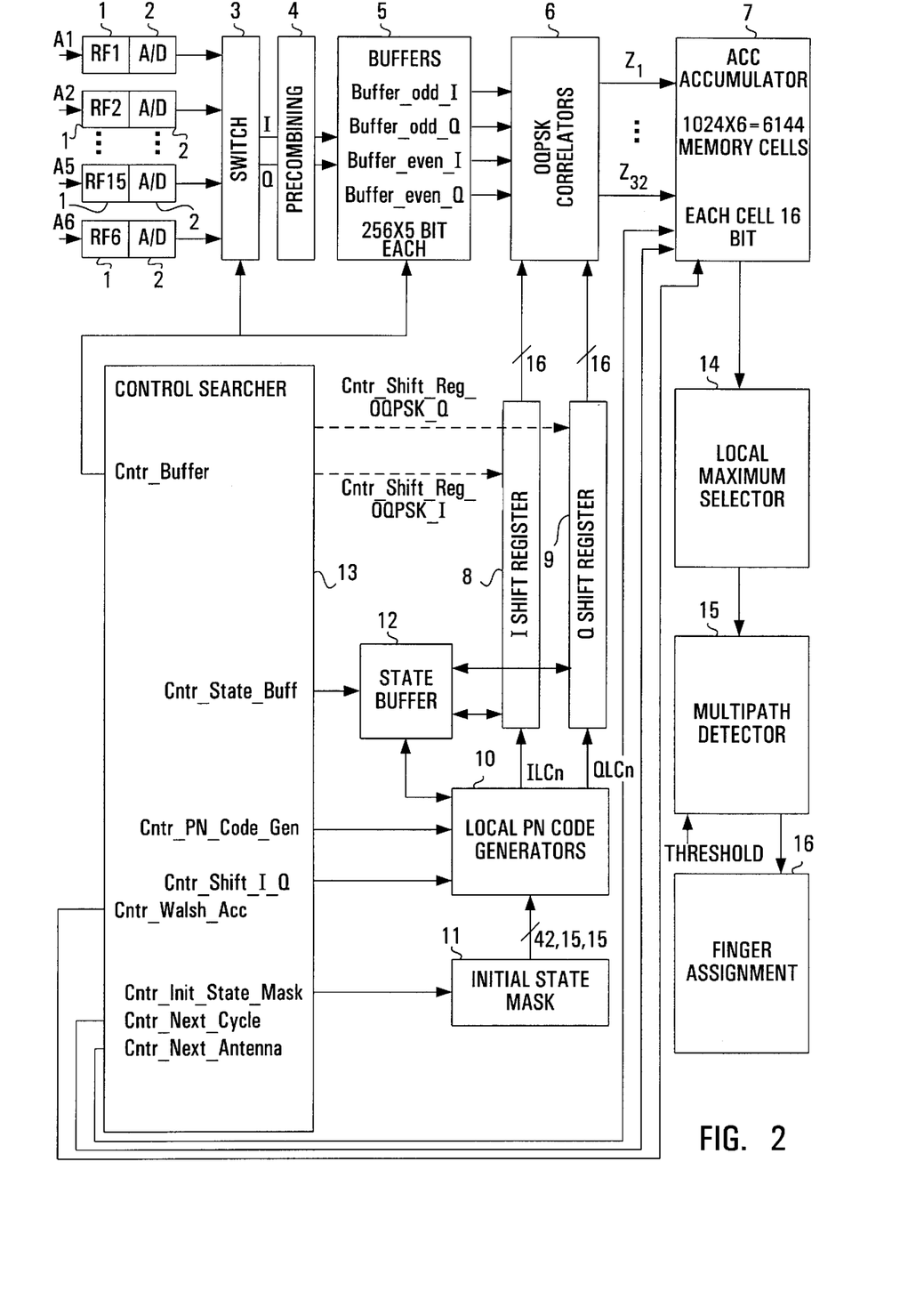
FIG. 2 is a block diagram of a searcher in which a first preferred embodiment of the present invention is implemented within.

FIG. 2 is a block diagram of the searcher architecture within which the first preferred embodiment of the present invention is implemented. The following parameters may apply to an embodiment of the present invention.

PN chip rate: 1.2288 Mcps

Frame duration: 20 ms.

One frame contains 96 Walsh symbols

Long Code from a 42-bit LFSR

I-channel and Q-channel PN codes from 15-bit LFSR's

Modulation: OQPSK

Access procedure: Sending of an access probe consisting of an Access Channel preamble and an Access Channel message capsule.

Access Channel preamble can be from 1 to 16 frames (20–320 ms)

Uncertainty region is less than 512 PN chips.

One Walsh symbol comprises 256 PN chips.

Those skilled in the art will recognize that these parameters may be changed depending upon the choice of components.

It is assumed by way of example that the architecture resides in a CDMA base station covering three sectors, in which each sector has two diversity antennas. There are thus six antennas, designated A1 through A6. It will be apparent to those skilled in the art that more or fewer than 3 sectors may be involved and more or fewer than two antennas per sector may be employed. The delay may be determined separately for each of the diversity antennas in a sector because each may be receiving over a different path in a multipath environment.

Each antenna connects to a Radio Frequency (RF) unit 1, which converts the received signal to baseband. Analog-to-Digital (A/D) converters 2, each coupled to a respective RF unit 1, take 4-bit samples of the signals, at a rate of 8 times the PN chip rate (oversampling). In alternative embodiments, greater or lesser sampling rates could be employed.

A switch 3, coupled to all of the A/D converters 2, processes samples from one antenna at a time. For the antenna currently being sampled, a precombining element 4 coupled to the switch 3, under control of control searcher 13, stores four sequences of combinations of the four-bit samples into buffers 5. In this embodiment, the range of samples used corresponds to the duration of one Walsh symbol (256 PN chips). It is assumed that the samples are numbered 1, 2, 3, 4, 5, . . . For a sequence of samples in each of the I and Q sample streams:

Buffer_odd_I stores the sums of samples 3 and 7, 11 and 15, 19 and 23, . . . , 2043 and 2047 from the stream of I samples;

Buffer_odd_Q stores corresponding sums from the stream of Q samples;

Buffer_even_I stores the sums of samples 7 and 11, 15 and 19, 23 and 27, . . . , 2047 and 2051 from the stream of I samples; and Buffer_even_Q stores corresponding sums from the Q stream of samples.

The present embodiment contemplates oversampling for possible use of other portions of the receiver not discussed in conjunction with the present invention. For example, some portions of the receiver may rely on oversampling in order to adjust delays by increments considerably finer than one PN chip duration. The present embodiment uses only two samples per PN chip duration.

There are thus 256 stored sums in each buffer, each five bits in size since they are each the sums of two four-bit samples. Samples used in filling even buffers are inherently delayed one-half of a PN chip from samples used in filling odd buffers by virtue of being derived from samples taken half a chip time later. These special combinations of samples, working in conjunction with the interconnectivity of the buffers 5 with correlators 6, impart the ability to double the speed of signal processing with no loss in signal-to-noise ratio.

OQPSK correlators 6, coupled to the buffers 5, correlate the "piece" of the received signal stored in the buffers 5 against all the possible states, over the uncertainty region, of local PN code generators 10, as will be described in detail herein below. In the mobile station, the Long Code (LC) is typically produced by a 42-bit Linear Feedback Shift Register (LFSR) of known configuration, and the $PN_I$ and $PN_Q$ codes by 15-bit LFSRs of known configurations. By means well known to those in the art, LFSRs of the same configurations may be included in the base station receiver, in this case within the local PN code generators 10, as may an initial state mask 11. With these components, the local PN code generators 10 can output, by means well known to those in the art, ILC and QLC sequences by adding successive bits of the $PN_I$ and $PN_Q$ sequences respectively to successive bits of the LC sequence in modulo-2 arithmetic. The bit sequences ILC, QLC thus produced, being "local replicas" of the codes employed in the mobile station.

These code sequences ILC, QLC, in the preferred embodiments, are input serially into I and Q shift registers 8, 9 respectively, as shown in FIG. 2, to produce shifted versions of the code sequences ILC, QLC. These shifted versions are henceforth referred to as ILCn, QLCn, where n is the number of shifts that the sequence has undergone. For example, ILC0, QLC0 are the unshifted local replicas. The shift registers 8, 9, within the preferred embodiments, are coupled between the correlators 6 and the local PN code generators 10, and comprise 15 individual registers. The shift registers 8, 9, the local PN code generators 10, the initial state mask 11, and a state buffer 12 that is coupled to both the shift registers 8, 9 and the local PN code generators 10, together comprise the components of the first preferred embodiment of the present invention depicted in FIG. 2 and are described in more detail herein below with reference to FIG. 5. The second preferred embodiment is described herein below with reference to FIG. 6.

Figure 3:
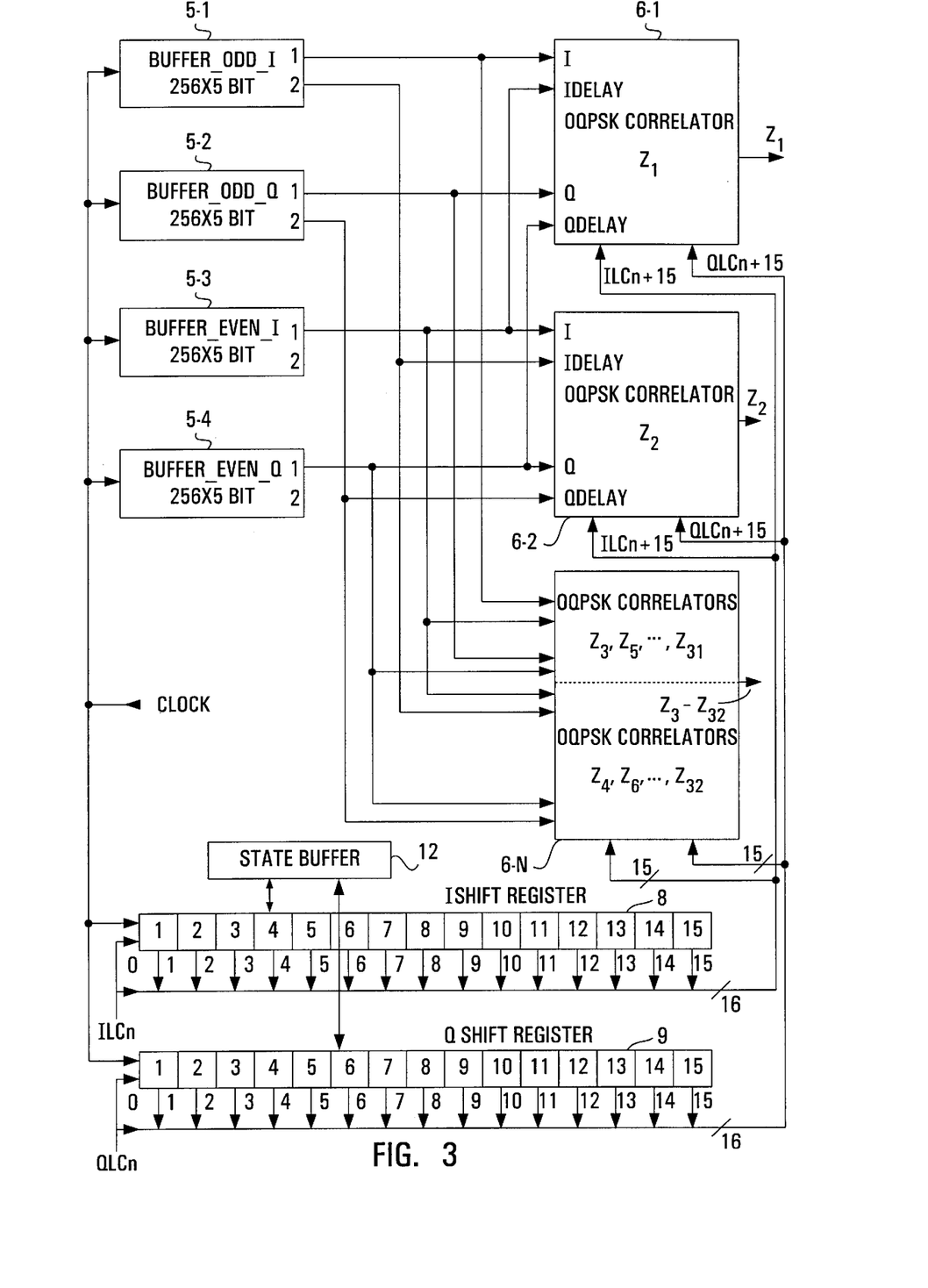
FIG. 3 is a block diagram illustrating operation of the multi-branch OQPSK correlators depicted in FIG. 2.

FIG. 3 illustrates further detail of the searcher of FIG. 2 including details of the first preferred embodiment of the present invention. In particular, the correlators 6, first shown in FIG. 2, are now shown in FIG. 3 as elements 6-1 and 6-2, connoting correlators Z1 and Z2 respectively, along with a generalized correlator element 6-N schematically representing correlators Z3, Z4, Z5, . . . , Z32. The presently described embodiment employs 32 correlators, although in alternative embodiments that number may be adjusted upward to improve performance or downward to enhance economy.

The number of the correlators 6 is double (32) the number of taps available from either of the shift registers 8, 9 (16 total taps). Each pair of correlators (i.e., Z1 and Z2; Z3 and Z4; . . . ; Z31 and Z32) use the same ILCn, QLCn sequences from the shift registers 8, 9. Special connections of the pairs of the correlators 6 with the buffers 5 provide calculation of correlation integrals in such a way that correlation values from each pair of correlators Z1 and Z2; Z3 and Z4; . . . ; Z31 and Z32 are one-half PN chip apart.

Any clock rate may be utilized for the buffers 5 and the shift registers 8, 9 provided it does not exceed the capabilities of the circuitry employed. The present embodiment uses a clock rate of 19.66 MHz, which is 16 times the PN chip rate and which is within the capabilities of modern circuitry.

Within FIG. 3, the buffers 5 are illustrated as buffers 5-1 through 5-4. Each of these has outputs 1 and 2, although the output 2 is utilized only on buffers 5-1 and 5-2. The output 2, within each buffer 5, is delayed one PN chip time from the output 1. Each of the correlators 6 has four inputs from the buffers 5, labelled I, Idelay, Q, and Qdelay. FIG. 3 shows details of the interconnectivity of the buffers 5 and the correlators 6. Each of the correlators 6 also has an input from a particular tap on each of the I and Q shift registers 8, 9. It is seen that pairs of the correlators 6 connect to identical taps within the shift registers 8, 9. For example, correlators Z1 and Z2 connect to tap 15 on both the shift registers 8, 9, correlators Z3 and Z4 (implicit in generalized element 6-N) to tap 14, etc. Because of the aforementioned delays, the correlators 6 within a pair work with stored samples one-half a PN chip duration apart. Said delays are summarized in Table 1.

TABLE 1

| | INPUT | DELAY (PN chips) |
|---|---|---|
| Correlator Z1: | I | 0 |
| (exemplary for odd- | Idelay | 1/2 |
| numbered correlators) | Q | 0 |
| | Qdelay | 1/2 |
| Correlator Z2: | I | 0 |
| (exemplary for even- | Idelay | 1/2 |
| numbered correlators) | Q | 0 |
| | Qdelay | 1/2 |

It is seen from Table 1 that Z2 (and all the even-numbered correlators) have all inputs delayed one-half PN chip relative to the inputs to Z1. Thus, the two correlation values produced by each pair of correlators are one-half PN chip duration apart. It is also seen that the aforementioned precombining of samples one-half PN chip duration apart facilitates obtaining correlation values with ½ PN chip resolution.

The "piece" of received signal stored in the buffers 5 is to be correlated against segments of the local replicas over the uncertainty region to determine which one yields a significantly greater correlation value and thus to determine the delay. Each segment is 256 bits in length (to match the number of sample sums in each buffer), which in turn was chosen so as to cover one Walsh symbol period. The total number of segments used, for each of the ILC and QLC sequences, will be 512, equal to the size of the uncertainty region. The first segment used will start from the first bit position of the local replicas, and each of the 511 succeeding segments will start with the 511 next succeeding bit positions. Since the correlators 6 work in pairs, each member of a pair working with data samples one-half a PN chip duration apart, the use of 512 segments results in 1024 correlation values, enabling the determination of the delay within half a PN chip duration.

Figure 4:
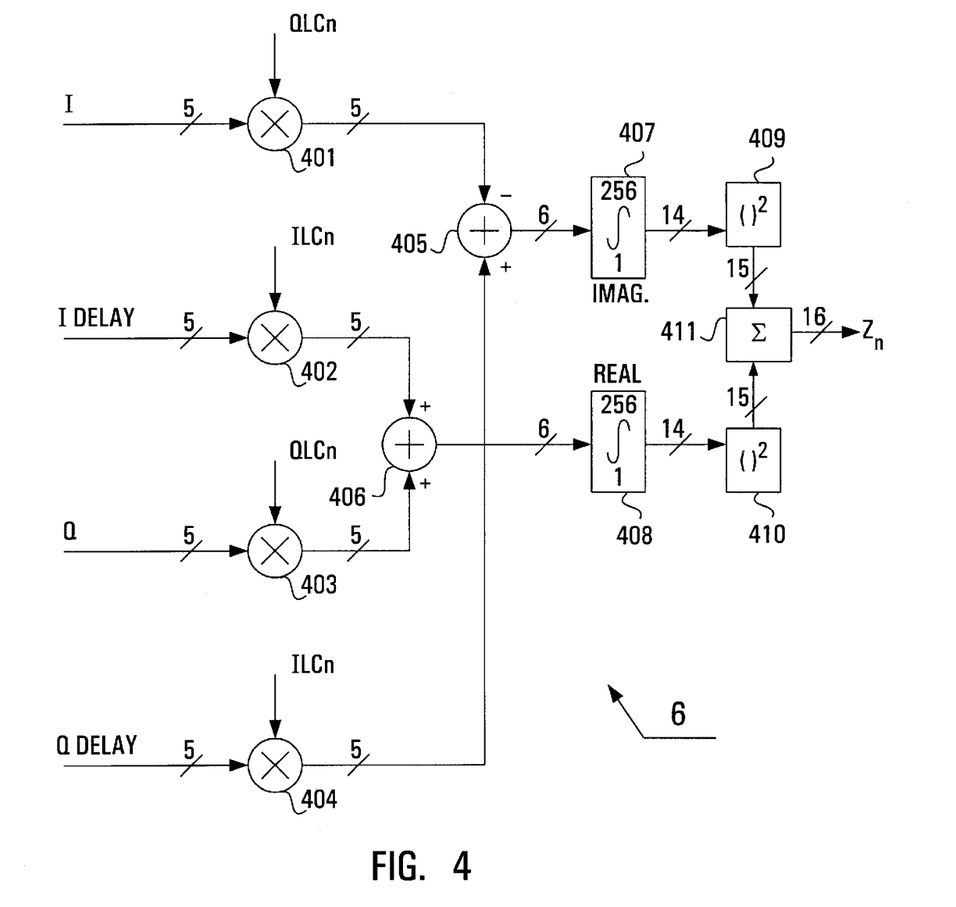
FIG. 4 depicts the logic functions performed by the correlators of FIG. 3.

FIG. 4 illustrates the logic functions performed within each of the correlators 6. The I, Idelay, Q, and Qdelay inputs from the buffers 5 each consist of five-bit samples. The I and Q inputs are multiplied, with multipliers 401, 403, by the bits of the particular QLCn sequence output from the particular tap of the shift registers 8, 9 for that particular correlator 6. The Idelay and Qdelay inputs, on the other hand, are multiplied, with multipliers 402, 404, by the bits of the corresponding ILCn sequence. These multipliers 401, 402, 403, 404, as well as other components of the correlator 6, are depicted schematically to indicate functionality. Details of handling multiple bits is left as a design choice.

The outputs of the multipliers 401 and 404, which are five-bit products, are added with an adder 405 to produce a six-bit imaginary sum and the outputs of the multipliers 402 and 403 are added with an adder 406 to produce a six-bit real sum. 256 imaginary and real sums are integrated by each of integrators 407, 408 respectively as 256 bits of the local replica are clocked through the shift registers 8, 9. The integral of 256 six-bit sums can be 14 bits in length. The integrals are then squared by elements 409, 410 respectively and the results are truncated to 15 bits in length, which is sufficiently precise for the presently described embodiment. The two results from the elements 409, 410 are summed by an element 411 to produce the 16-bit Z output for the particular correlator, which is one of 32 correlators producing Z1 through Z32.

Referring again to FIG. 2, the correlator outputs are stored in Accumulator (ACC) 7, seen to have 6144 sixteen-bit cells, equal to 1024 sixteen-bit cells for each of the six antennas of the present embodiment. It has thus far been shown how the first 32 cells for the current antenna are determined and loaded.

With use of FIGS. 5 and 6, it will now be described in detail how the ILC and QLC sequences are generated with use of the first and second preferred embodiment respectively of the present invention and how a similar process of correlations are performed an additional 31 times to complete the 1024 cells for one antenna.

Figure 5:
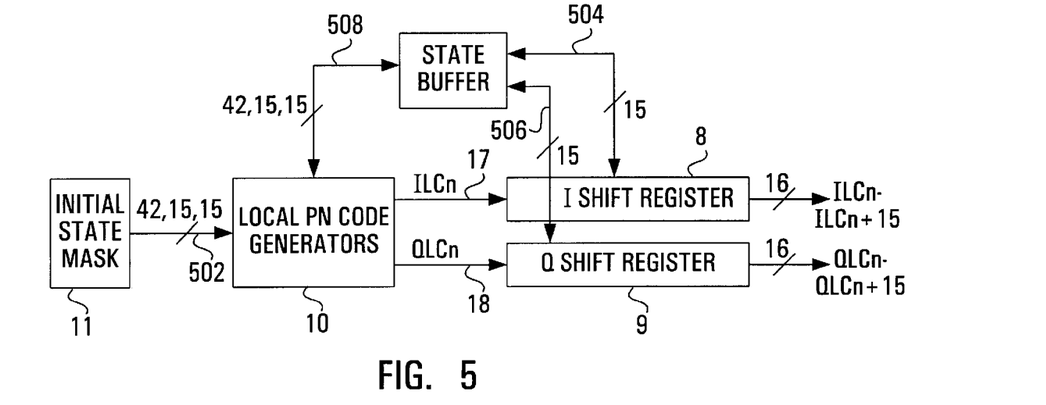
FIG. 5 depicts the elements of the first preferred embodiment of the present invention.
Figure 6:
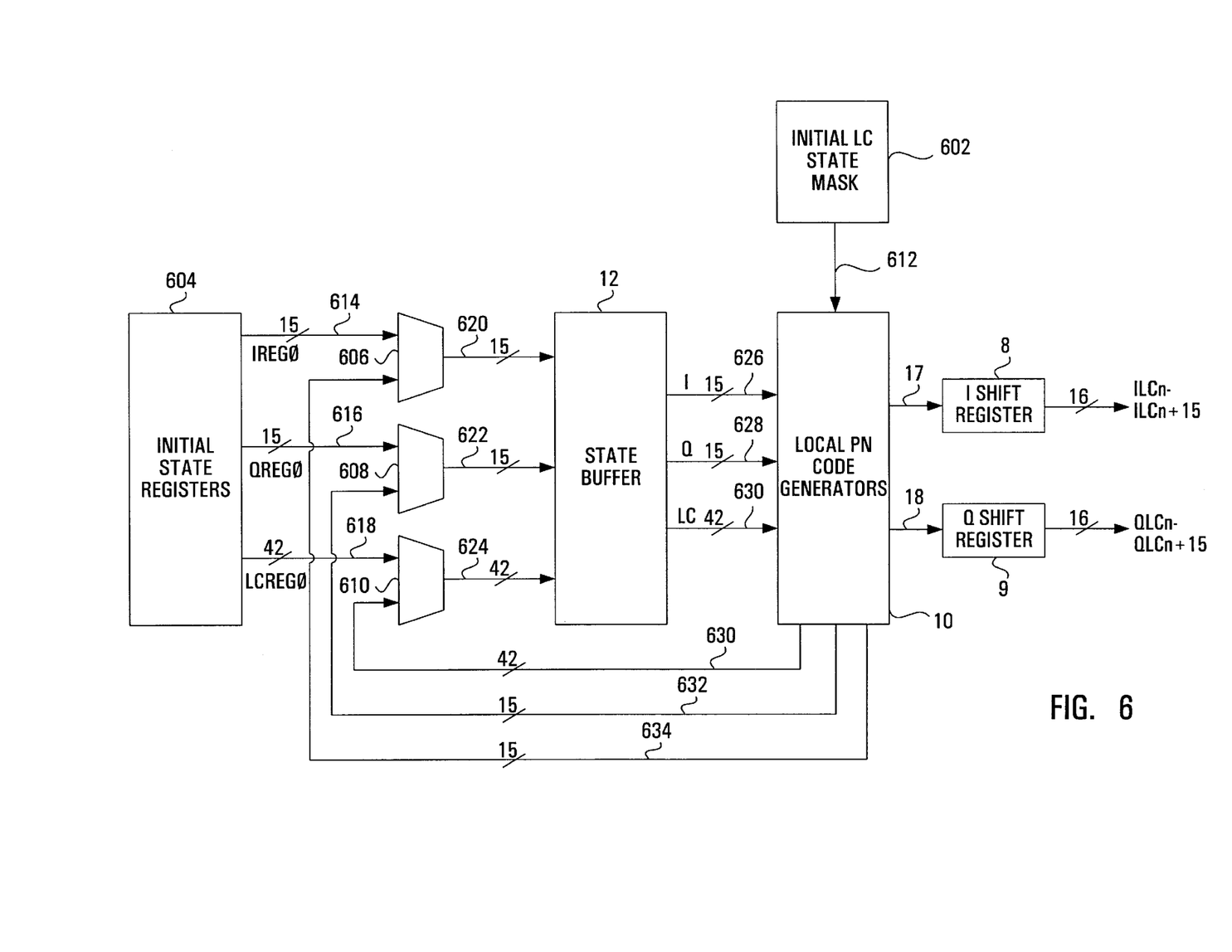
FIG. 6 depicts the elements of a second preferred embodiment of the present invention.

FIG. 5 depicts an overall searcher PN generator that comprises, according to the first preferred embodiment, the initial state mask 11, the local PN code generators 10, the state buffer 12, and the I and Q shift registers 8, 9. Initially, the initial state mask 11 transfers, via a bus 502, to the local PN code generators 10 the initial state of the LC LFSR, the $PN_I$ LFSR, and the $PN_Q$ LFSR that are within the corresponding mobile station and are hereinafter referred to as LCREG0, IREG0, and QREG0 respectively. One skilled in the art would recognize that the LC LFSR would also comprise an LC mask which, in this first preferred embodiment, is defined within the local PN code generators 10.

The second preferred embodiment of the overall searcher PN generator is similar to the first preferred embodiment, but with a slight modification in implementation. According to the second preferred embodiment, the overall searcher PN generator comprises, as depicted in FIG. 6, an initial LC state mask 602, initial state registers 604, first, second, and third selectors 606, 608, 610, the state buffer 12, the local PN code generators 10, and the I and Q shift registers 8, 9. Initially, the initial LC state mask 602 transfers, via a bus 612, to the local PN code generators 10 the initial LC mask for the LC LFSR. Then the initial state registers 604 transfer the IREG0, QREG0, and LCREG0 states that are in the corresponding mobile station to the respective selectors 606, 608, 610, via buses 614, 616, 618 respectively. At first, the selectors 606, 608, 610 are configured to transfer the IREG0, QREG0, and LCREG0 values to the state buffer 12 via buses 620, 622, 624 respectively and subsequently to the corresponding LFSRs within the local PN code generators 10, via buses 626, 628, 630 respectively.

Subsequently, according to both the first and second preferred embodiments, the local PN code generators 10 start producing the ILC0 and QLC0 sequences with the shift registers 8, 9 being loaded, via buses 17, 18 respectively, with the first 15 bits of each respective sequence. This is done by clocking the bits through the 15 registers that comprise each of the shift registers 8, 9.

Denoting the bits of the ILC0 and QLC0 sequences as bits 1, 2, 3, etc., it is seen in FIG. 3 that correlators Z1 and Z2 are now input with bit 1 of the ILC0, QLC0 sequences respectively from tap 15 (depicted in FIG. 3) of the shift registers 8, 9 respectively); correlators Z3 and Z4 with bit 2 (and hence bit 1 of the ILC1, QLC1 sequences respectively); and so on up through correlators Z31 and Z32 being input with bit 16 (and hence bit 1 of the ILC15, QLC15 sequences respectively).

The shift registers 8, 9 are then shifted (and the local PN code generators 10 are advanced) 256 times. Referring to Table 2 at the "1st Pass" entry, it is seen that correlators Z1 and Z2 now correlate bits 1–256 of the ILC0, QLC0 sequences against the 256 sums stored in each of the buffers 5 as described previously; correlators Z3 and Z4 correlate bits 2-257 which comprise the ILC1, QLC1 sequences; and so on up through correlators Z31 and Z32 correlating bits 16–271 that comprise the ILC15, QLC15 sequences. This completes the first pass and results in the storing of the first 32 correlator values, for the current antenna, within the ACC 7.

TABLE 2

|  | Bits input to CORR's Z1,Z2 | Bits input to CORR's Z3,Z4 | . . . | Bits input to CORR's Z3,Z4 | Leading bit in save |
|---|---|---|---|---|---|
| 1st Pass (256 shifts with save after 16) | 1–256 | 2–257 | . . . | 16–271 | 17 |
| (Restore) 2nd Pass | 17–272 | 18–273 | . . . | 32–287 | 33 |
| (Restore) 3rd Pass | 33–288 | 34–289 | . . . | 48–303 | 49 |
| . | . | . | . | . |  |
| . | . | . | . | . |  |
| . | . | . | . | . |  |
| (Restore) 31st Pass | . | . | . | 497 | 497 |
| . | . | . | . |  |  |
| . | . | . | . |  |  |
| (Restore) 32nd Pass | 497–752 | 498–743 | . . . | 512–767 | XXX |

In the first preferred embodiment, after 16 shifts within each pass, the state buffer 12 stores the states of the shift registers 8, 9, via buses 504, 506 respectively, and the local PN code generators 10, via the bus 508. In the first pass, the LFSRs are thus saved at the point when they were about to produce bit 17 of the ILC0, QLC0 sequences, as shown in Table 2. In this first preferred embodiment, the state buffer consists of 102 bits, 42 for the LC LFSR, 15 for each of the PN LFSRs, and 15 for each of the shift registers 8, 9. Prior to each successive pass, the shift registers 8, 9 and the LFSRs within the local PN code generators 10 are restored, according to the first preferred embodiment, from the state buffer 12.

In the second preferred embodiment, after 16 shifts within each pass, the state buffer 12 stores the states of the local PN code generators 10 via buses 630, 632, 634, the selectors 606, 608, 610, and the buses 620, 622, 624 respectively. Similar to the first preferred embodiment, the LFSRs within the local PN code generators 10 are saved beginning with bit 17 of the ILC0, QLC0 sequences and are restored from the state buffer 12 prior to each successive pass. In the second preferred embodiment, the state buffer 12 consists of only 72 bits, 42 for the LC LFSR and 15 for each of the PN LFSRs.

In the second preferred embodiment, but not in the first preferred embodiment, the local PN code generators 10 must be turned on after being restored from the state buffer 12 in order to generate the first 16 bits of the current ILCn, QLCn sequences that are required to reinitialize the shift registers 8, 9. In the first preferred embodiment, the shift registers 8, 9 are directly reinitiated from the state buffer 12.

After the restore procedure for the second pass in both the first and second preferred embodiments is complete, bit 17 of the respective ILC0, QLC0 sequences, which is bit 1 of the ILC16, QLC16 sequences, is the leading bit in the shift registers 8, 9 respectively. As shown in Table 2, the 256 shifts comprising the second pass input bits 17–272 to correlators Z1 and Z2, hence inputting the ILC16, QLC16 sequences; and so on up through inputting bits 32–287 to correlators Z31 and Z32, hence inputting the ILC31, QLC31 sequences. Once again during the second pass, the state buffer 12 saves, after 16 shifts, the contents of the LFSRs that were about to generate bit 33 of the ILC0, QLC0 sequences and in the first preferred embodiment, also the contents of the shift registers 8, 9. This information is restored when preparing for the third pass.

The net effect of the 32 passes is to output 32 ILCn and QLCn sequences to each of the 16 pairs of correlators 6 for a total of 1024 bit sequences (512 ILCn and 512 QLCn sequences) input to the combined correlators 6, where each sequence consists of 256 consecutive bits; the first sequence beginning with bit 1 of the particular ILC0 or QLC0 sequence, the second ith bit 2, and so on up through the 512th sequence beginning ith the 512th bit. 1024 correlation values are thus stored in he ACC 7, the correlation values representing time steps of one-half a PN chip duration. The correlation values thus span 512 PN chip durations. The uncertainly region having been taken to be 512 PN chips, the entire uncertainty region is represented.

Figure 7:
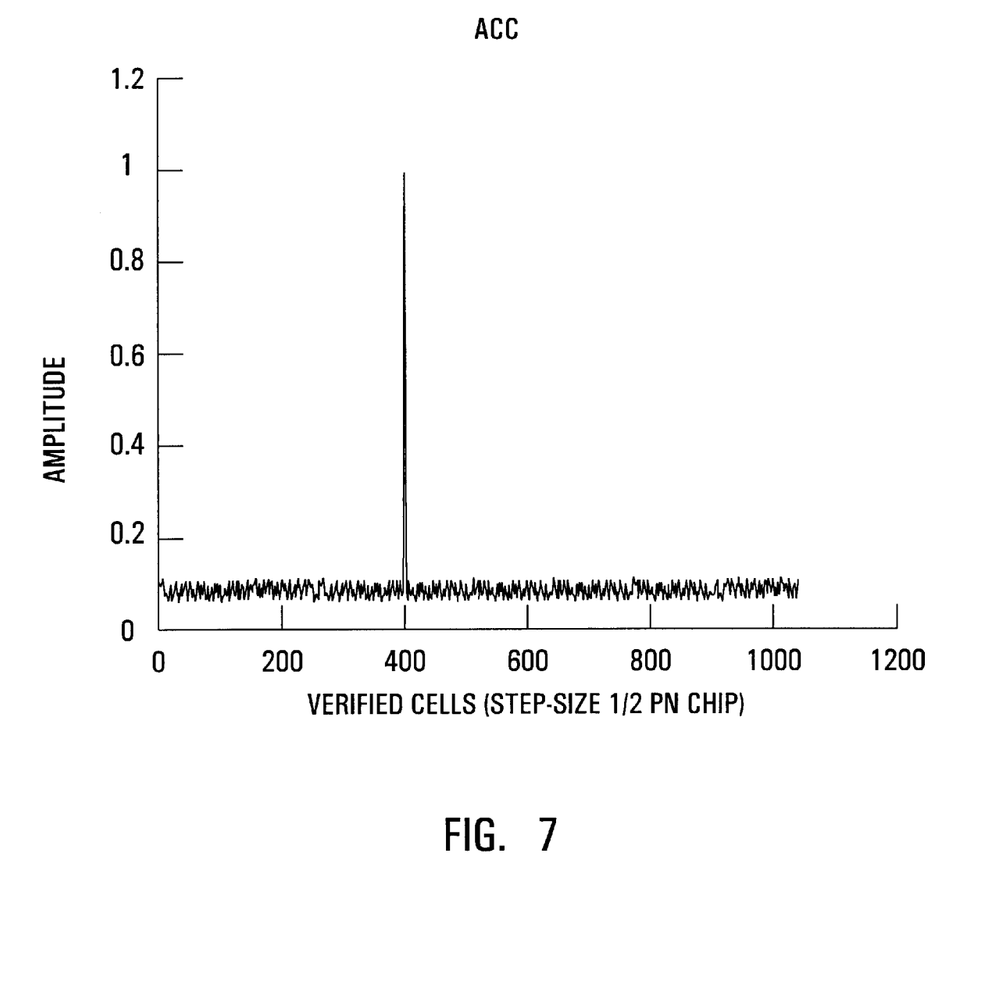
FIG. 7 is a graphical representation of exemplary outputs of the correlators of FIG. 2.

The correlator values may be examined as is well known in the art. FIG. 7 shows a graph of 1024 ACC 7 contents for one antenna with a significant peak at the 400th entry. Since the step-size in the present embodiment is one-half PN chip, it can thus be determined that the transmission delay is 200 PN chip times for this example.

Figure 8:
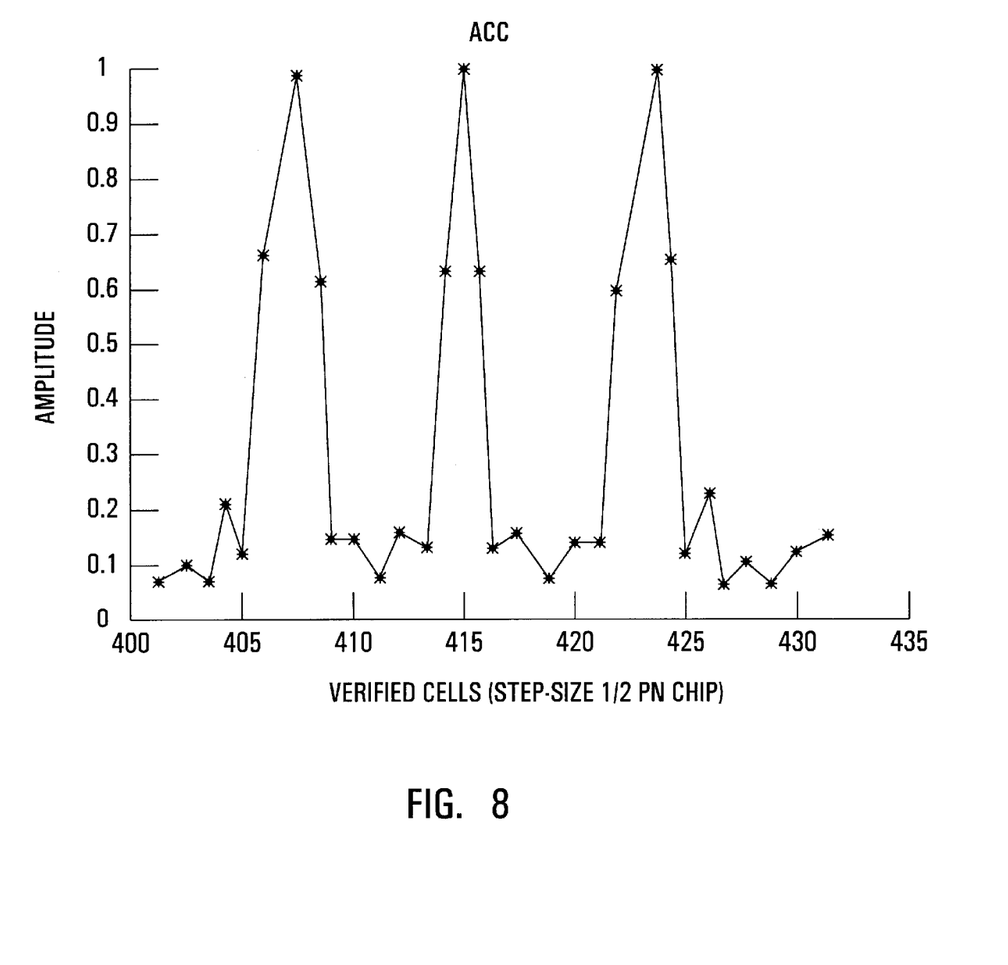
FIG. 8 is a graphical representation of exemplary outputs of the correlators of FIG. 2 which might occur during multipath reception.

FIG. 8 is a graph of a selected range of correlator values (positions 400 through 435) connoting delays corresponding to three received copies of the signal in a multipath environment. The relative increments of delay can be determined and, as is known in the art, can be used to configure the "fingers" in a "rake receiver" to optimize the quality of multipath reception.

The described embodiment, with its 32 correlators, 32 passes, and clock rate of 16 times the PN chip rate, is but one possible design choice for these parameters. It will be clear to those skilled in the art that an embodiment can be constructed having, for example, one-fourth the number of correlators but operating at a clock rate four times higher and with four times the number of passes, and that such an embodiment would exhibit the same overall performance as the discussed embodiment. The number of correlators could be increased to enhance performance or decreased to improve economy. Numerous other variations can be contemplated.

One skilled in the art would understand that the present invention is a code generation technique, to be implemented with parallel correlators, that reduces the disadvantages of having a code generator for each individual correlator. In an exemplary embodiment of the present invention multiple passes of the multiple correlation apparatus is required to fully correlate a required range. Although the preferred embodiments of the present invention have been described herein above within an efficient searcher, this is not meant to limit the scope of the present invention. In fact, the present invention should not even be limited to a searcher included within a communication system, but the principles of the present invention can be applied to any situation in which multiple correlators are utilized that require successive bit sequences. Successive sequences can mean sequences shifted by any predetermined number. In the preferred embodiments described herein above, the predetermined number is one.

There are a number of key advantages of the present invention. For one, the reduction in the number of code generators required to be implemented within a parallel correlation apparatus reduces the complexity and required resources significantly. For example, the present invention reduces the number of gates, the accompanying signalling, and the number of control access ports required to implement a parallel correlation apparatus. Since parallel correlators are relatively complex, it is important that the code generators be as simple as possible. Hence, the present invention's simplicity is one of its strongest virtues.

Persons skilled in the art will appreciate that there are alternative implementations and modifications possible to use an apparatus similar to that described above to increase the efficiency of multiple correlator systems, and that the above implementation is only an illustration of this embodiment of the invention. The scope of the invention, therefore, is only to be limited by the claims appended hereto.

What is claimed is:

1. A code generation apparatus arranged to be coupled to a plurality of correlation devices that are each input with a first sequence of data bits, the code generation apparatus comprising a code generator, a first shift register that comprises at least one individual register, and a state buffer;

wherein the code generator generates a second sequence of data bits that is output to the first shift register and the first shift register generates at least one shifted second sequence of data bits;

wherein the code generation apparatus is arranged such that each of the correlation devices is input with at least one of the second sequence of data bits and the shifted second sequence of data bits; and wherein the state buffer stores, after a predetermined number of shifts in the first shift register, storage information from at least the code generator; and outputs the storage information to at least the code generator at a predetermined restore time.

2. A code generation apparatus according to claim 1, wherein the state buffer stores, after the predetermined number of shifts in the first shift register, storage information from the first shift register and the code generator; and outputs the storage information to the first shift register and the code generator at the predetermined restore time.

3. A code generation apparatus according to claim 1, wherein the predetermined number of shifts in the first shift register is equal to the number of individual registers of the first shift register.

4. A code generation apparatus according to claim 1, wherein the code generator comprises at least two linear feedback shift registers (LFSRs) which are utilized to generate the second sequence of data bits; and wherein the storage information comprises at least the contents of the LFSRs.

5. A code generation apparatus according to claim 4, wherein the state buffer stores, after the predetermined number of shifts in the first shift register, storage information from the first shift register and the code generator; and outputs the storage information to the first shift register and the code generator at the predetermined restore time; and wherein the storage information comprises the contents of the individual registers of the first shift register and the contents of the LFSRs.

6. A code generation apparatus according to claim 4, wherein the LFSRs comprise a long code LFSR and at least one of an in-phase LFSR and a quadrature LFSR.

7. A code generation apparatus according to claim 1, wherein the predetermined restore time is the start of a next cycle period.

8. A code generation apparatus according to claim 1 further comprising an initial state mask; and wherein the initial state mask inputs initial state information to the code generator that is used by the code generator to generate the second sequence of data bits.

9. A code generation apparatus according to claim 8, wherein the code generator comprises at least two linear feedback shift registers (LFSRS) which are utilized to generate the second sequence of data bits; and wherein the initial state information comprises the initial contents of the LFSRs.

10. A code generation apparatus according to claim 9, wherein the storage information comprises at least the contents of the LFSRs.

11. A code generation apparatus according to claim 10, wherein the state buffer stores, after the predetermined number of shifts in the first shift register, storage information from the first shift register and the code generator; and outputs the storage information to the first shift register and the code generator at the predetermined restore time; and wherein the storage information comprises the contents of the individual registers of the first shift register and the contents of the LFSRs.

12. A code generation apparatus according to claim 9, wherein the LFSRs comprise a long code LFSR and at least one of an in-phase LFSR and a quadrature LFSR.

13. A code generation apparatus according to claim 12 further comprising a long code mask device, coupled to the code generator, that inputs a long code mask to the long code LFSR.

14. A code generation apparatus according to claim 1, wherein the first shift register comprises a plurality of individual registers and generates a plurality of shifted second sequences of data bits.

15. A code generation apparatus according to claim 1 further comprising a second shift register that comprises at least one individual register;

wherein the code generator generates a third sequence of data bits that is output to the second shift register and the second shift register generates at least one shifted third sequence of data bits;

wherein the code generation apparatus is arranged such that each of the correlation devices is input with at least one of the third sequence of data bits and the shifted third sequence of data bits; and wherein the state buffer stores, after a predetermined number of shifts in the first and second shift registers, storage information from at least the code generator; and outputs the storage information to at least the code generator at a predetermined restore time.

16. A code generation apparatus according to claim 15, wherein the state buffer stores, after the predetermined number of shifts in the first and second shift registers, storage information from the first and second shift registers and the code generator; and outputs the storage information to the first and second shift registers and the code generator at the predetermined restore time.

17. A code generation apparatus according to claim 15 further comprising an initial state mask;

wherein the initial state mask inputs initial state information to the code generator that is used by the code generator to generate the second and third sequences of data bits.

18. A code generation apparatus according to claim 17, wherein the code generator comprises at least three linear feedback shift registers (LFSRs) which are utilized to generate the second and third sequences of data bits; and wherein the initial state information comprises the initial contents of the LFSRs and the storage information comprises at least the contents of the LFSRs.

19. A code generation apparatus according to claim 18, wherein the state buffer stores, after the predetermined number of shifts in the first and second shift registers, storage information from the first and second shift registers and the code generator; and outputs the storage information to the first and second shift registers and the code generator at the predetermined restore time; and wherein the storage information comprises the contents of the individual registers of the first and second shift registers and the contents of the LFSRs.

20. A code generation apparatus according to claim 19, wherein the LFSRs comprise a long code LFSR, an in-phase LFSR, and a quadrature LFSR;

wherein the second sequence of data bits is generated with use of the long code LFSR and the in-phase LFSR, and the third sequence of data bits is generated with use of the long code LFSR and the quadrature LFSR.

21. A code generation apparatus according to claim 20 further comprising a long code mask device, coupled to the code generator, that inputs a long code mask to the long code LFSR.

22. A correlation apparatus incorporating the code generation apparatus according to claim 1, and further comprising a plurality of correlation devices, the correlation apparatus being input with a first sequence of data bits;

wherein the correlation devices are each input with the first sequence of data bits and at least one of the second sequence of data bits and the shifted second sequence of data bits.

23. A correlation apparatus according to claim 22, wherein the predetermined number of shifts in the first shift register is equal to the number of individual registers of the first shift register.

24. A correlation apparatus according to claim 22, wherein the predetermined restore time is the start of a next cycle period.

25. A correlation apparatus according to claim 22, wherein the code generation apparatus further comprises an initial state mask; and wherein the initial state mask inputs initial state information to the code generator that is used by the code generator to generate the second sequence of data bits.

26. A correlation apparatus according to claim 25, wherein the code generator comprises at least two linear feedback shift registers (LFSRs) which are utilized to generate the second sequence of data bits; and wherein the initial state information comprises the initial contents of the LFSRs and the storage information comprises at least the contents of the LFSRs.

27. A correlation apparatus according to claim 26, wherein the state buffer stores, after the predetermined number of shifts in the first shift register, storage information from the first shift register and the code generator; and outputs the storage information to the first shift register and the code generator at the predetermined restore time; and wherein the storage information comprises the contents of the individual registers of the first shift register and the contents of the LFSRs.

28. A correlation apparatus according to claim 26, wherein the LFSRs comprise a long code LFSR and at least one of an in-phase LFSR and a quadrature LFSR.

29. A correlation apparatus according to claim 22, wherein the shift register comprises a plurality of individual registers and generates a plurality of shifted second sequences of data bits.

30. A correlation apparatus according to claim 29, wherein the number of correlation devices is equal to or greater than the number of shifted second sequences.

31. A correlation apparatus according to claim 29, wherein the number of correlation devices is at least twice the number of shifted second sequences.

32. A Code Division Multiple Access (CDMA) search apparatus incorporating the correlation apparatus according to claim 22.

33. In a code generation apparatus arranged to be coupled to a plurality of correlation devices that are each input with a first sequence of data bits, a method of generating a second sequence of data bits for inputting to each of the correlation devices, the method comprising the steps of:

initializing a code generator;

generating a second sequence of data bits with use of the code generator;

shifting the second sequence of data bits in order to generate at least one shifted second sequence of data bits with use of a first shift register;

outputting at least one of the second sequence of data bits and the shifted second sequence of data bits to each of the correlation devices;

after shifting the second sequence of data bits a predetermined number of shifts, saving storage information from at least the code generator; and outputting the storage information to at least the code generator at a predetermined restore time.

* * * * *